United States Patent
Filippini et al.

(10) Patent No.: US 7,176,174 B2
(45) Date of Patent: *Feb. 13, 2007

(54) WATER-IN-OIL EMULSION

(75) Inventors: Brian B. Filippini, Mentor-on-the-Lake, OH (US); John J. Mullay, Mentor, OH (US); Deborah A. Langer, Chesterland, OH (US); Jeffrey M. Carey, Mentor, OH (US); Robert W. Dix, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 285 days.

This patent is subject to a terminal disclaimer.

(21) Appl. No.: 10/383,188

(22) Filed: Mar. 6, 2003

(65) Prior Publication Data

US 2004/0176263 A1 Sep. 9, 2004

(51) Int. Cl.
*C11D 3/43* (2006.01)

(52) U.S. Cl. ............. 510/201; 510/204; 510/206; 510/212; 510/213; 510/242; 510/365; 510/417

(58) Field of Classification Search ............ 510/201, 510/204, 206, 212, 213, 242, 365, 417
See application file for complete search history.

(56) References Cited

U.S. PATENT DOCUMENTS

| | | | | |
|---|---|---|---|---|
| 2,996,450 A * | 8/1961 | Zech et al. | ........... | 507/110 |
| 3,565,678 A * | 2/1971 | Johnson et al. | ........ | 427/427.5 |
| 3,726,807 A * | 4/1973 | Johnson et al. | ........ | 516/69 |
| 3,838,050 A | 9/1974 | Miller | ............ | 508/238 |
| 3,948,800 A * | 4/1976 | Meinhardt | ............ | 516/31 |
| 4,285,827 A | 8/1981 | Wyatt | ............ | 252/165 |
| 4,447,348 A | 5/1984 | Forsberg | ............ | 252/75 |
| 4,448,703 A | 5/1984 | Forsberg | ............ | 252/75 |
| 4,606,840 A * | 8/1986 | Gautier et al. | ........ | 510/417 |
| 4,708,753 A | 11/1987 | Forsberg | ............ | 149/2 |
| 4,749,500 A | 6/1988 | Forsberg et al. | ........ | 252/49.3 |
| 4,826,618 A | 5/1989 | Borseth et al. | ........ | 252/174.21 |
| RE33,210 E * | 5/1990 | Stoufer | ............ | 510/417 |
| 5,019,138 A | 5/1991 | Farrah et al. | ........ | 55/89 |
| 5,084,263 A | 1/1992 | McCoy et al. | ........ | 423/413 |
| 5,246,503 A * | 9/1993 | Minick | ............ | 134/38 |
| 5,443,748 A | 8/1995 | Bergishagen et al. | ........ | 252/162 |
| 5,518,661 A | 5/1996 | Langford et al. | ........ | 252/364 |
| 5,569,410 A | 10/1996 | Distaso | ............ | 510/202 |
| 5,605,579 A | 2/1997 | Distaso | ............ | 134/38 |
| 5,726,140 A | 3/1998 | Distaso | ............ | 510/207 |
| 5,821,209 A | 10/1998 | Distaso et al. | ........ | 510/207 |
| 5,827,749 A * | 10/1998 | Akers, Jr. | ............ | 436/534 |
| 5,851,972 A | 12/1998 | Distaso et al. | ........ | 510/206 |
| 5,854,188 A | 12/1998 | Distaso et al. | ........ | 510/206 |
| 5,911,838 A | 6/1999 | Barnett | ............ | 134/38 |
| 6,130,192 A | 10/2000 | Vitomir | ............ | 510/202 |
| 6,153,573 A | 11/2000 | Reynolds | ............ | 510/203 |
| 6,162,776 A | 12/2000 | Marquis et al. | ........ | 510/201 |
| 6,169,061 B1 | 1/2001 | Machac, Jr. et al. | ........ | 510/201 |
| 6,174,847 B1 | 1/2001 | Lallier | ............ | 510/203 |
| 6,280,485 B1 * | 8/2001 | Daly et al. | ............ | 44/301 |
| 6,303,552 B1 | 10/2001 | Vitomir | ............ | 510/202 |
| 6,348,107 B1 | 2/2002 | Whitton et al. | ........ | 134/38 |
| 6,368,367 B1 * | 4/2002 | Langer et al. | ........ | 44/301 |
| 6,369,009 B1 | 4/2002 | Machac, Jr. et al. | ........ | 510/201 |
| 6,395,103 B1 | 5/2002 | Machac, Jr. et al. | ........ | 134/40 |
| 6,468,952 B1 | 10/2002 | Reynolds | ............ | 510/203 |
| 6,479,445 B1 | 11/2002 | Machac, Jr. et al. | ........ | 510/206 |
| 6,482,270 B1 | 11/2002 | Machac, Jr. et al. | ........ | 134/38 |
| 6,606,856 B1 * | 8/2003 | Brown et al. | ............ | 60/299 |
| 6,624,222 B2 | 9/2003 | Kestyn et al. | ........ | 524/314 |
| 6,648,929 B1 * | 11/2003 | Daly et al. | ............ | 44/301 |
| 6,652,607 B2 * | 11/2003 | Langer et al. | ........ | 44/301 |
| 6,748,905 B2 * | 6/2004 | Duncan et al. | ........ | 123/25 E |
| 6,824,623 B1 | 11/2004 | Gross et al. | ............ | 134/36 |
| 6,858,046 B2 * | 2/2005 | Daly et al. | ............ | 44/301 |
| 2002/0088167 A1 * | 7/2002 | Filippini et al. | ........ | 44/301 |

FOREIGN PATENT DOCUMENTS

| | | |
|---|---|---|
| DE | 1145892 | 3/1963 |
| DE | 2910452 A1 | 9/1980 |
| EP | 0196162 A2 | 10/1986 |
| EP | 0196162 A3 | 10/1986 |
| EP | 0561600 A2 | 9/1993 |
| EP | 0846736 A1 | 6/1998 |
| EP | 0860482 B1 | 1/2003 |
| JP | 2002/44849 | 2/2002 |
| WO | WO 94/23012 | 10/1994 |
| WO | WO 95/10570 | 4/1995 |
| WO | WO 96/04342 | 2/1996 |
| WO | WO 97/24409 | 7/1997 |
| WO | WO 99/01515 | 1/1999 |
| WO | WO02/053802 A1 | 7/2002 |

OTHER PUBLICATIONS

UK Patent Application No. GB2049721A published Dec. 31, 1980—English equivalent of DE 2910452A1.

* cited by examiner

*Primary Examiner*—Lorna M. Douyon
(74) *Attorney, Agent, or Firm*—Teresan W. Gilbert; Michael F. Esposito

(57) ABSTRACT

A water-in-oil emulsion composition is disclosed. The composition contains (A) a solvent, (B) water, and (C) a surfactant. This composition is suitable for removing non-aqueous coatings such as paints and the like as well as waxes and greases from substrates.

3 Claims, No Drawings

WATER-IN-OIL EMULSION

TECHNICAL FIELD

This invention relates to water-in-oil emulsion compositions. These compositions comprise a solvent, water and a surfactant. These compositions are useful in removing non-aqueous coatings, waxes, greases, and the like, from substrates to which the coatings, waxes, greases, and the like, have been applied.

BACKGROUND OF THE INVENTION

Coatings removers are typically liquids that contain principally solvents, sometimes in combination with wax or thickeners. When applied to a painted or coated substrate, these compositions typically soften or dissolve the paint or coating and bring it to such a condition that it can be easily removed. The solvents that are typically used include methylene chloride, mineral spirits, toluene, alcohols, acetone, methyl ethyl ketone and N-methylpyrrolidone. A problem with these coatings removers is that many of the solvents that are used are classified as volatile organic solvents (VOC) and as a result their use leads to air emission problems.

The present invention provides a solution to this problem. With the present invention a water-in-oil emulsion composition is provided that is useful as a non-aqueous coatings remover which reduces the amount of emissions emitted as compared to non-water-in-oil emulsion prior art coatings removers and yet provides desired coatings removal properties. These compositions are also useful as wax and grease removers.

SUMMARY OF THE INVENTION

This invention relates to a water-in-oil emulsion composition, comprising:

(A) a solvent selected from the group consisting of aliphatic hydrocarbons, aromatic hydrocarbons, alcohols, ethers, esters, glycol ethers, hydrofluoroethers, ketones, aldehydes, lactones, terpenes, chlorinated non-polymeric hydrocarbons, pyrrolidones, and mixtures of two or more thereof;

(B) water; and (C) a surfactant comprising:

(C)(i) a product made from the reaction of an acylating agent with ammonia, an amine, a hydroxyamine, an alcohol, water, or a mixture of two or more thereof;

(C)(ii) a product derived from: a polycarboxylic acylating agent; a copolymer derived from at least one olefin monomer and at least one alpha, beta unsaturated carboxylic acid or derivative thereof; and a linking compound having two or more primary amino groups, two or more secondary amino groups, at least one primary amino group and at least one secondary amino group, at least two hydroxyl groups, or at least one primary or secondary amino group and at least one hydroxyl group;

(C)(iii) a Mannich reaction product derived from a hydroxy aromatic compound, an aldehyde or a ketone, and an amine containing at least one primary or secondary amino group;

(C)(iv) a hydrocarbyl substituted carboxylic acid, the hydrocarbyl substiuent of the acid containing at least about 12 carbon atoms;

(C)(v) at least one compound represented by one or more of the formulae:

RO(R'O)$_n$R'''    (C)(v)-1

$$RO(R''CH\overset{\displaystyle OR}{-}R'O)_nR'''$$    (C)(v)-2

RCOO(R'O)$_n$R'''    (C)(v)-3

(C)(v)-5

(C)(v)-6 wherein in Formulae (C)(v)-1 to (C)(v)-6, each R is independently hydrogen or a hydrocarbyl group of up to about 60 carbon atoms; each R' and R'' is independently an alkylene group of 1 to about 20 carbon atoms; each R''' is independently hydrogen, or an acyl or hydrocarbyl group of up to about 30 carbon atoms; n is a number in the range of zero to about 50; and x, y and z are independently numbers in the range of zero to about 50 with the total for x, y and z being at least 1;

(C)(vi) an ionic or nonionic compound having a hydrophilic-lipophilic balance of about 1 to about 40; or (C)(vii) a mixture of two or more of (C)(i) through (C)(vi).

DETAILED DESCRIPTION OF THE INVENTION

The terms "hydrocarbon" and "hydrocarbyl," when referring to groups attached to the remainder of a molecule, refer to groups having a purely hydrocarbon or predominantly hydrocarbon character within the context of this invention. These groups include the following:

(1) Purely hydrocarbon groups; that is, aliphatic, alicyclic, aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Examples include methyl, octyl, cyclohexyl, phenyl, etc.

(2) Substituted hydrocarbon groups; that is, groups containing non-hydrocarbon substituents which do not alter the predominantly hydrocarbon character of the group. Examples include hydroxy, nitro, cyano, alkoxy, acyl, etc.

(3) Hetero groups; that is, groups which, while predominantly hydrocarbon in character, contain atoms other than carbon in a chain or ring otherwise composed of carbon atoms. Examples include nitrogen, oxygen and sulfur.

In general, no more than about three substituents or hetero atoms, and in one embodiment no more than one, will be present for each 10 carbon atoms in the hydrocarbon or hydrocarbyl group.

The term "lower" as used herein in conjunction with terms such as hydrocarbon, hydrocarbyl, alkyl, alkenyl, alkoxy, and the like, is intended to describe such groups which contain a total of up to 7 carbon atoms.

The term "hydroxyamine" refers to an amine containing at least one —OH group attached to any carbon atom or nitrogen atom in the molecule. These include aminoalcohols which are also known as alkanolamines.

The term "oil-soluble" refers to a material that is soluble in mineral oil to the extent of at least about 0.5 gram per liter at 25° C.

The term "water-soluble" refers to materials that are soluble in water to the extent of at least 0.5 gram per 100 milliliters of water at 25° C.

The Water-in-Oil Emulsion Composition

The water-in-oil emulsion composition comprises (A) a solvent, (B) water, and (C) a surfactant, and optionally additional additives as needed, including rheology control agents, antimisting agents, odor suppressants, corrosion inhibitors, coloring is agents, biocides, corrosion inhibitors, antifreeze agents, and the like.

The water-in-oil emulsion compositions are in the form of water-in-oil emulsions which include micro-emulsions. These emulsions are characterized by a continuous organic phase, and a discontinuous aqueous phase. Throughout the specification and in the claims the term "oil" (as in water-in-oil emulsion) is sometimes used to refer to the organic phase. In one embodiment, the water-in-oil emulsion composition is characterized by a dispersed aqueous phase comprising droplets having a mean diameter of about 0.05 to about 50 microns, and in one embodiment about 0.05 to about 30 microns, and in one embodiment about 0.05 to about 10 microns, and in one embodiment about 0.1 to about 10 microns, and in one embodiment, 0.2 to about 10 microns, and in one embodiment about 0.3 to about 10 microns, and in one embodiment about 0.5 to about 7 microns, and in one embodiment about 0.5 to about 5 microns.

The Brookfield viscosity of the water-in-oil emulsion composition using a No. 3 spindle at 10 rpm may be up to about 100,000 centipose (cP) at 25° C., and in one embodiment from about 5 to about 50,000 cP at 25° C., and in one embodiment from about 10 to about 10,000 cP at 25° C.

In one embodiment, the water-in-oil emulsion composition is characterized by the absence of an oxygen supplying oxidizer salt. The compositions that may be characterized by the absence of such oxygen supplying oxidizer salts, in one embodiment, include those wherein (A) is an aliphatic hydrocarbon, aromatic hydrocarbon, alcohol or ether; in this embodiment glycol ethers and hydrofluoroethers are not included within this group of excluded materials. The oxygen supplying oxidizer salts include ammonium, alkali or alkaline earth metal nitrates, chlorates or perchlorates. Included within this group are compounds represented by the formula

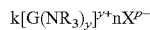

wherein G is hydrogen or an organic group of 1 to about 8 carbon atoms having a valence of y; each R independently is hydrogen or a hydrocarbyl group of 1 to about 10 carbon atoms; $X^{p-}$ is a nitrate or an acetate anion having a valence of p; and k, y, n and p are independently integers of at least 1. Examples include ammonium nitrate, sodium nitrate, calcium nitrate, ammonium chloride, sodium perchlorate, ammonium perchlorate, ammonium acetate, methylammonium nitrate, methylammonium acetate, ethylene diamine diacetate, ureanitrate, and urea dintrate. In embodiments wherein the oxygen supplying oxidizer salt is excluded, it will be understood that the water-in-oil emulsion compositions may contain trace or impurity levels of such oxygen supplying oxidizer salts, for example, concentrations less than about 0.001% by weight, and in one embodiment less than about 0.0008% by weight, and in one embodiment less than about 0.0005% by weight.

The Solvent (A)

The solvent (A) may comprise one or more solvents selected from aliphatic hydrocarbons, aromatic hydrocarbons, alcohols, ethers, glycol ethers, hydrofluoroethers, esters, ketones, aldehydes, lactones, terpenes, non-polymeric chlorinated hydrocarbons, pyrrolidones, and mixtures of two or more thereof.

The aliphatic and aromatic hydrocarbons include naphtha, mineral spirits, alkenes of about 5 to about 20 carbon atoms (e.g., pentene, hexenes, octenes, and the like), toluene, the xylenes, and mixtures of two or more thereof. In one embodiment, the naphtha is a heavy aromatic naphtha solvent having a specific gravity of about 0.895 grams per milliliter (g/ml), a flash point in excess of about 62° C., and a viscosity of about 1.2 cSt at 25° C. In one embodiment, the naphtha is a light aromatic naphtha solvent having a specific gravity of about 0.874 g/ml, a flash point in excess of about 104° C., and a viscosity of about 0.9 cSt at 25° C.

The alcohols may be mono- or polyhydric hydrocarbon-based alcohols such as methanol, ethanol, the propanols, butanols, pentanols, hexanols, heptanols, octanols, decanols, and the like. Also included are fatty alcohols and mixtures thereof, including saturated alcohols such as lauryl, myristyl, cetyl, stearyl and behenyl alcohols, and unsaturated alcohols such as palmitoleyl, oleyl and eicosenyl. Higher synthetic monohydric alcohols of the type formed by the Oxo process (e.g., 2-ethylhexanol), by the aldol condensation, or by organoaluminum-catalyzed oligomerization of alpha-olefins (e.g., ethylene), followed by oxidation, may be used. Alicyclic analogs of the above-described alcohols may be used; examples include cyclopentanol, cyclohexanol, cyclododecanol, and the like.

The polyhydroxy compounds that may be used include ethylene, propylene, butylene, pentylene, hexylene and heptylene glycols; tri-, tetra-, penta-, hexa- and heptamethylene glycols and hydrocarbon-substituted analogs thereof (e.g., 2-ethyl-1,3-trimethylene glycol, neopentyl glycol, etc.), as well as polyoxyalkylene compounds such as diethylene and higher polyethylene glycols, tripropylene glycol, dibutylene glycol, dipentylene glycol, dihexylene glycol and diheptylene glycol, and their monoethers.

Phenol, naphthols, substituted phenols (e.g., the cresols), and dihydroxyaromatic compounds (e.g., resorcinol, hydroquinone), as well as a benzyl alcohol and similar di-hydroxy compounds wherein the second hydroxy group is directly bonded to an aromatic carbon (e.g., 3—HOφCH$_2$OH wherein φ is a divalent benzene ring) are alcohols that may be used.

The ethers may contain up to about 20 carbon atoms, and in one embodiment up to about 10 carbon atoms. These include methyl ether, ethyl ether, n-propyl ether, isopropyl ether, n-butyl ether, vinyl ether, allyl ether, anisole, ethyl phenyl ether, phenyl ether, 1,4-dioxane, tetrahydrofuran, and the like.

The hydrofluoroethers include pentaflurodimethyl ether, tetrafluorodimethyl ether, flurodimethyl ether, methyl tetrafluoroethyl ether, methyl trifluroethyl ether, methyl hepta fluoropropyl ether, nonafluorodiethyl ether, methylhexafluoropropyl ether, methoxy nonafluorobutene, ethoxy nonafluorobutene, and the like.

The glycol ethers include ethylene glycol monomethyl ether, ethylene glycol monomethyl ether acetate, ethylene glycol monoethyl ether, ethylene glycol monoethyl ether acetate, ethylene glycol monopropyl ether, ethylene glycol monobutyl ether, ethylene glycol dimethyl ether, ethylene glycol diethyl ether, diethylene glycol, diethylene glycol monomethyl ether, diethylene glycol monoethyl ether acetate, diethylene glycol monobutyl ether, diethylene glycol dimethyl ether, triethylene glycol dimethyl ether, propylene glycol monomethyl ether, propylene glycol monomethyl ether acetate, dipropylene glycol, dipropylene glycol monomethyl ether, and the like.

The esters may be monoesters or dibasic esters. The monoesters may contain up to about 20 carbon atoms, and in one embodiment up to about 10 carbon atoms. These esters may include other functional groups in the compound. For example, the monoesters may include ether groups such as methyl, ethyl, propyl or butyl ether groups. The monoesters may include alkyl acetates of oxo alcohols. Examples of the monoesters that may be used include ethyl acetate, propyl acetate, butyl acetate, ethyl-3-ethoxy-propionate, propylene glycol methyl ether acetate, propylene glycol butyl ether acetate, dipropylene glycol methyl ether acetate, dipropylene glycol butyl ether acetate. Lactate esters may be used. Cyclic esters such as butyrolactone may be used.

The dibasic ester may comprise dialkyl esters wherein each alkyl group independently has 1 to about 6 carbon atoms, of an aliphatic dibasic acid having 2 to about 10 carbon atoms. In one embodiment, the dibasic ester is a dialkyl ester, wherein each alkyl group independently has 1 to about 4 carbon atoms, of an aliphatic dibasic acid having 2 to about 6 carbon atoms. Examples of the dibasic acids include adipic acid, glutaric acid, succinic acid, and the like. Examples of the dibasic esters include dimethyl glutarate, dimethyl adipate, and the like.

The aldehydes and ketones include aldehydes and ketones of up to about 20 carbon atoms, and in one embodiment up to about 10 carbon atoms. These include formaldehyde, acetaldehyde, propionaldehyde, n-butyraldehyde, n-valeraldehyde, caproaldehyde, heptaldehyde, phenylacetaldehyde, benzaldehyde, o-tolualdehyde, m-toluaidehyde, p-tolualdehyde, salicylaldehyde, p-hydroxybenzaldehyde, acetone, acetophenone, dimethyl ketone, diethyl ketone, methyl ethyl ketone, dipropyl ketone, 2-propanone, cyclohexanone, diphenyl ketone, methyl butyl ketone, methyl isobutyl ketone, methyl amyl ketone, methyl hexyl ketone, methyl phenyl ketone, and mixtures of two or more thereof.

The lactones include compounds represented by the formula

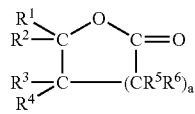

wherein $R^1$, $R^2$, $R^3$, $R^4$, $R^5$ and $R^6$ are independently H or hydrocarbyl groups of from 1 to about 30 carbon atoms; $R^2$ and $R^3$ can be linked together to form an aliphatic ring; and a is a number in the range of zero to about 4. The procedures for preparing lactones of this type through intramolecular cyclization of hydroxy-containing carboxylic acids accompanied by the elimination of water are well known in the art. Generally, the cyclization is promoted by the presence of materials such as acetic anhydride, and the reaction is effected by heating the mixtures to elevated temperatures such as the reflux temperature while removing volatile materials including water.

The terpenes include the various isomeric terpene hydrocarbons having the empirical formula $C_{10}H_{16}$, such as contained in turpentine, pine oil and dipentenes, and the various synthetic and naturally occurring oxygen-containing derivatives. Mixtures of these various compounds generally may be utilized, especially when natural products such as pine oil and turpentine are used. Pine oil, for example, which is obtained by destructive distillation of waste pine wood with super-heated steam comprises a mixture of terpene derivatives such as alpha-terpineol, beta-terpineol, alpha-fenchol, camphor, borneol/isoborneol, fenchone, estragole, dihydro alpha-terpineol, anethole, and other mono-terpene hydrocarbons. The specific ratios and amounts of the various components in a given pine oil will depend upon the particular source and the degree of purification. Pine oil products generally known as terpene alcohols available from Hercules may be used. Examples of such products include alpha-Terpineol containing about 95–97% of alpha-Terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60–65 weight percent of alpha-terpineol and 15–20% beta-terpineol, and 18–20% of other tertiary terpene alcohols. Other mixtures and grades of useful pine oil products also are available from Hercules under such designations as Yarmor 302, Herco pine oil, Yarmor 302W, Yarmor F and Yarmor 60.

The chlorinated non-polymeric hydrocarbons include methylene chloride, perchloroethylene, trichoroethylene, chloroform, methyl chloroform, chlorobenzene, dichlorobenzene, and mixtures of two or more thereof.

The pyrrolidones include N-methylpyrrolidone.

In one embodiment, the solvent (A) is selected from the group consisting of: naptha; mineral spirits; turpentine; toluene; xylene; methylene chloride; perchloroethylene; acetone; methyl ethyl ketone; N-methyl pyrrolidone; dimethyl glutarate; dimethyl adipate; and mixtures of two or more thereof.

The solvent (A) may be present in the water-in-oil emulsion composition at a concentration of about 1 to about 99% by weight, and in one embodiment about 25 to about 85% by weight, and in one embodiment about 50% to about 80% by weight.

The Water (B)

The water may be taken from any convenient source. Tap water may be used. In one embodiment, the water is deionized. In one embodiment, the water is purified using reverse osmosis or distillation.

The water may be present in the water-in-oil emulsion composition at a concentration of about 1 to about 99% by weight, and in one embodiment about 15 to about 75% by weight, and in one embodiment about 20 to about 50% by weight.

The Surfactant (C)

The surfactant (C) may function as an emulsifier and may be referred to as an emulsifier. The surfactant (C) may be one or more of any of the surfactants (C)(i) to (C)(iv) referred to above and discussed below. The concentration of the surfactant (C) in the water-in-oil emulsion composition may range from about 0.1 to about 10% by weight, and in one embodiment about 0.5 to about 5% by weight, and in one embodiment about 0.5 to about 3% by weight.

Surfactant (C)(i)

The surfactant (C)(i) may be one or more products made by reacting one or more acylating agents with one or more of ammonia, an amine, a hydroxyamine, an alcohol, or water. The acylating agent may be one or more carboxylic acids or reactive equivalents thereof. The carboxylic acids may be monobasic or polybasic. The polybasic acids include dicarboxylic acids, although tricarboxylic and tetracarboxylic acids may be used. The reactive equivalents may be acid halides, anhydrides or esters, including partial esters, and the like.

The acylating agent may be a carboxylic acid or reactive equivalent thereof having about 10 to about 34 carbon atoms, and in one embodiment about 12 to about 24 carbon atoms. These acylating agents may be monobasic acids, polybasic acids, or reactive equivalents of such mono- or polybasic acids. These include fatty acids. Examples include lauric acid, myristic acid, palmitic acid, stearic acid, isostearic acid, oleic acid, linoleic acid, linolenic acid, arachidic acid, behenic acid, erucic acid, lignoceric acid, tall oil acid, coconut oil fatty acid, and the like. Dimers and trimers of the foregoing may be used. The polybasic acids may be dicarboxylic, although tricarboxylic or tetracarboxylic acids may be used. These include hydrocarbon substituted succinic acids or anhydrides wherein the hydrocarbon substituent has from about 6 to about 30 carbon atoms, and in one embodiment about 12 to about 24 carbon atoms.

The acylating agent may be a hydrocarbon substituted carboxylic acid or reactive equivalent made by reacting one or more alpha, beta olefinically unsaturated carboxylic acid reagents containing 2 to about 20 carbon atoms, exclusive of the carboxyl groups, with one or more olefin polymers. The olefin polymers may contain about 30 to about 500 carbon atoms, and in one embodiment about 50 to about 500 carbon atoms.

The alpha-beta olefinically unsaturated carboxylic acid reagents may be either monobasic or polybasic in nature. Exemplary of the monobasic alpha-beta olefinically unsaturated carboxylic acid reagents include the carboxylic acids corresponding to the formula

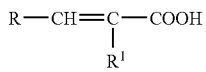

wherein R is hydrogen, or a saturated aliphatic or alicyclic, aryl, alkylaryl or heterocyclic group, and $R^1$ is hydrogen or a lower alkyl group. R may be a lower alkyl group. The total number of carbon atoms in R and $R^1$ typically does not exceed about 18 carbon atoms. Examples include acrylic acid; methacrylic acid; cinnamic acid; crotonic acid; 3-phenyl propenoic acid; alpha, and beta-decenoic acid. The polybasic acid reagents may be dicarboxylic, although tri- and tetracarboxylic acids can be used. Examples include maleic acid, fumaric acid, mesaconic acid, itaconic acid and citraconic acid. Reactive equivalents include the anhydride, ester or amide functional derivatives of the foregoing acids. A useful reactive equivalent is maleic anhydride.

The olefin monomers from which the olefin polymers may be derived include polymerizable olefin monomers characterized by having one or more ethylenic unsaturated groups. They can be monoolefinic monomers such as ethylene, propylene, butene-1, isobutene and octene-1, or polyolefinic monomers (usually di-olefinic monomers such as butadiene-1,3 and isoprene). Usually these monomers are terminal olefins, that is, olefins characterized by the presence of the group $>C=CH_2$. However, certain internal olefins can also serve as monomers (these are sometimes referred to as medial olefins). When such medial olefin monomers are used, they normally are employed in combination with terminal olefins to produce olefin polymers that are interpolymers. The olefin polymers may include aromatic groups and alicyclic groups. These include olefin polymers derived from such interpolymers of both 1,3-dienes and styrenes such as butadiene-1,3 and styrene or para-(tertiary butyl) styrene.

Generally the olefin polymers are homo- or interpolymers of terminal hydrocarbon olefins of about 2 to about 30 carbon atoms, and in one embodiment about 2 to about 16 carbon atoms, and in one embodiment about 2 to about 6 carbon atoms, and in one embodiment 2 to about 4 carbon atoms.

In one embodiment, the olefin polymers are polyisobutenes (or polyisobutylenes) such as those obtained by polymerization of a $C_4$ refinery stream having a butene content of about 35 to about 75% by weight and an isobutene content of about 30 to about 60% by weight in the presence of a Lewis acid catalyst such as aluminum chloride or boron trifluoride. These polyisobutenes generally contain predominantly (that is, greater than about 50 percent of the total repeat units) isobutene repeat units.

The olefin polymer may be a polyisobutene having a high methylvinylidene isomer content, that is, at least about 50% by weight, and in one embodiment at least about 70% by weight methylvinylidenes. Suitable high methylvinylidene polyisobutenes include those prepared using boron trifluoride catalysts.

The acylating agent may be a hydrocarbon-substituted (e.g., polyisobutene substituted) succinic acid or anhydride wherein the hydrocarbon substituent has from about 30 to about 500 carbon atoms, and in one embodiment from about 50 to about 500 carbon atoms. The hydrocarbon substituent may have a number average molecular weight of about 750 to about 3000, and in one embodiment about 900 to about 2000. In one embodiment, the number average molecular weight is from about 750 to about 1500, and in one embodiment it is from about 1500 to about 3000.

In one embodiment, the hydrocarbon-substituted succinic acids or anhydrides are characterized by the presence within their structure of an average of at least about 1.3 succinic groups, and in one embodiment from about 1.5 to about 2.5, and in one embodiment form about 1.7 to about 2.1 succinic groups for each equivalent weight of the hydrocarbon substituent. The ratio of succinic groups to equivalent of substituent groups present in the hydrocarbon-substituted succinic acylating agent (also called the "succination ratio") can be determined by one skilled in the art using conventional techniques (such as from saponification or acid numbers). This is described in U.S. Pat. No. 4,234,435, which is incorporated herein by reference.

The conditions for reacting the alpha, beta olefinically unsaturated carboxylic acid reagent with the olefin polymer are known to those in the art. Examples of patents describing various procedures for preparing useful acylating agents include U.S. Pat. Nos. 3,215,707; 3,219,666; 3,231,587; 3,912,764; 4,110,349; 4,234,435; 6,165,235; and U.K. Patent 1,440,219. The disclosures of these patents are hereby incorporated by reference.

The acylating agent may be a linked compound comprised of (I) a first polycarboxylic acylating agent having at least one hydrocarbon substituent of about 6 to about 500 carbon atoms (e.g., about 50 to about 500 carbon atoms), and (II) a second polycarboxylic acylating agent optionally having at least one hydrocarbon substituent of up to about 500 carbon atoms (e.g., about 12 to about 500 carbon atoms) linked together by a linking group (III). The acylating agents (I) and (II) may be the same or they may be different. The linking group may be derived from a compound having two or more primary amino groups, two or more secondary amino groups, at least one primary amino group and at least one secondary amino group, at least two hydroxyl groups, or at least one primary or secondary amino group and at least one hydroxyl groups. The weight ratio of (I):(II) may be from about 5:95 to about 95:5, and in one embodiment about 25:75 to about 75:25.

The linking group (III) for linking the first acylating agent (I) with the second acylating agent (II) may be derived from a polyol, a polyamine or a hydroxyamine. The polyols may be represented by the formula $$R-(OH)_m$$

wherein in the foregoing formula, R is an organic group having a valency of m, R is joined to the OH groups through carbon-to-oxygen bonds, and m is an integer from 2 to about 10, and in one embodiment 2 to about 6. R may be a hydrocarbon group of 1 to about 40 carbon atoms, and in one embodiment 1 to about 20 carbon atoms. The polyol may be a glycol. The alkylene glycols are useful. Examples of the polyols that may be used include ethylene glycol, diethylene glycol, triethylene glycol, 1,2-butanediol, and the like.

The polyamines may be aliphatic, cycloaliphatic, heterocyclic or aromatic compounds. The polyamines may be hydroxyalkyl alkylene polyamines. The alkylene polyamines may be represented by the formula:

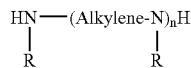

wherein n has an average value between 1 and about 14, and in one embodiment about 2 to about 10, and in one embodiment about 2 to about 7, the "Alkylene" group has from 1 to about 10 carbon atoms, and in one embodiment about 2 to about 6 carbon atoms, and each R is independently hydrogen, an aliphatic or hydroxy-substituted aliphatic group of up to about 30 carbon atoms. These alkylene polyamines include methylene polyamines, ethylene polyamines, diethylene triamine, butylene polyamines, propylene polyamines, pentylene polyamines, etc. Specific examples of such polyamines include ethylene diamine, diethylene triamine, triethylene tetramine, tetraethylene pentamine, pentaethylene hexamine, hexaethylene heptamine, propylene diamine, trimethylene diamine, tripropylene tetramine, N-(2-hydroxyethyl) ethylene diamine, and the like.

The hydroxyamines may be primary or secondary amines. In one embodiment, the hydroxyamine is (1) an N-(hydroxyl-substituted hydrocarbon) amine, (2) a hydroxyl-substituted poly(hydrocarbonoxy) analog of (1), or a mixture of (1) and (2). The hydroxyamine may be an alkanol amine containing from 1 to about 40 carbon atoms, and in one embodiment 1 to about 20 carbon atoms, and in one embodiment 1 to about 10 carbon atoms. These include primary amines, secondary amines, and mixtures thereof.

The hydroxyamine may be a hydroxy-substituted primary amine represented by the formula $$R_a-NH_2$$

wherein $R_a$ is a monovalent organic group containing at least one alcoholic hydroxy group. The total number of carbon atoms in $R_a$ may be from 1 to about 20, and in one embodiment 1 to about 10. The polyhydroxy-substituted alkanol primary amines wherein there is only one amino group present (i.e., a primary amino group) having one alkyl substituent containing 1 to about 10 carbon atoms, and 1 to about 6 hydroxyl groups are useful.

The linked acylating agents may be formed by reacting the acylating agents (I) and (II) with the linking compound (III) under ester and/or amide-forming conditions. This normally involves heating acylating agents (I) and (II) with the linking compound (III), optionally in the presence of a normally liquid, substantially inert, organic liquid solvent/diluent. Temperatures of at least about 30° C. up to the decomposition temperature of the reaction component and/or product having the lowest such temperature can be used. This temperature may be in the range of about 50° C. to about 250° C. The ratio of reactants may be varied over a wide range. Generally, for each equivalent of each of the acylating agents (I) and (II), at least about one equivalent of the linking compound (III) is used. The upper limit of linking compound (III) is about 2 equivalents of linking compound, (III) for each equivalent of acylating agents (I) and (II). Generally the ratio of equivalents of acylating agent (I) to the acylating agent (II) is about 0.5 to about 2, with about 1:1 being useful. The product made by this reaction may be in the form of statistical mixture that is dependent on the charge of each of the acylating agents (I) and (II), and on the number of reactive sites on the linking compound (III). For example, if an equal molar ratio of acylating agents (I) and (II) is reacted with ethylene glycol, the product may comprise a mixture of (1) 50% of compounds wherein one molecule the acylating agent (I) is linked to one molecule of the acylating agent (II) through the ethylene glycol; (2) 25% of compounds wherein two molecules of the acylating agent (I) are linked together through the ethylene glycol; and (3) 25% of compounds wherein two molecules of the acylating agent (II) are linked together through the ethylene glycol.

The amines, alcohols and hydroxyamines which are useful for reacting with the acylating agent to form the surfactant (C)(i) include the amines, alcohols and hydroxyamines discussed above as being useful as linking compounds. Also included are primary and secondary monoamines, tertiary mono- and polyamines, mono-alcohols, and tertiary alkanol amines. The tertiary amines are analogous to the primary amines, secondary amines and hydroxyamines discussed above with the exception that they may be either monoamines or polyamines and the hydrogen atoms in at least one of the H—N< or —NH$_2$ groups are replaced by hydrocarbon groups.

The monoamines that are useful for reacting with the acylating agent to form the surfactant (C)(i) may be represented by the formula

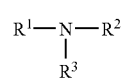

wherein $R^1$, $R^2$ and $R^3$ are the same or different hydrocarbon groups. $R^1$, $R^2$ and $R^3$ may be hydrocarbon groups of from 1 to about 20 carbon atoms, and in one embodiment from 1 to about 10 carbon atoms. Examples of useful tertiaryamines include trimethylamine, tributylamine, monomethyldiethylamine, dimethylpentylamine, and the like.

Tertiary alkanol amines that are useful for reacting with the acylating agent to form the surfactant (C)(i) include those represented by the formulae:

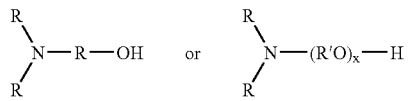

wherein each R is independently a hydrocarbon group of 1 to about 8 carbon atoms or hydroxyl-substituted hydrocarbon group of 2 to about 8 carbon atoms and R' is a divalent hydrocarbon group of about two to about 18 carbon atoms, and x is a number from 2 to about 15. Examples include dimethylethanol amine and diethylethanol amine.

Polyamines which are useful for reacting with the acylating agent to form the surfactant (C)(i) include the alkylene polyamines discussed above as well as alkylene polyamines with only one or no hydrogens attached to the nitrogen atoms.

The amines useful for reacting with the acylating agent to form the surfactant (C)(i) include heavy polyamines. The term "heavy polyamine" refers to a polyamine having seven or more nitrogens per molecule and two or more primary amines per molecule. The heavy polyamines typically comprise mixtures of ethylene polyamines. They often result from the stripping of polyamine mixtures, to remove lower molecular weight polyamines and volatile components, to leave, as residue, what is often termed "polyamine bottoms". In general, polyamine bottoms may be characterized as having less than about 2% by weight material boiling below about 200° C.

The mono-alcohols which are useful for reacting with the acylating agent to form the surfactant (C)(i) may contain from 1 to about 40 carbon atoms, and in one embodiment 1 to about 20 carbon atoms. Examples include methyl alcohol, ethyl alcohol, secondary butyl alcohol, isobutyl alcohol, cyclopentanol, and the like. The mono-alcohols also include the alcohols represented by the formula $RO(R^1O)_nH$ 

wherein R is hydrogen or a hydrocarbon group of 1 to about 40 carbon atoms, and in one embodiment 1 to about 20 carbon atoms; $R^1$ is an alkylene group of 1 to about 6 carbon atoms, and in one embodiment about 2 to about 4 carbon atoms; and n is a number in the range of about 1 to about 30, and in one embodiment about 6 to about 30. R may be a straight chain or branched chain alkyl or alkenyl group. $R^1$ may be a $C_2$, $C_3$ or $C_4$ alkylene group, or a mixture of two or more thereof.

The surfactant (C)(i) may be in the form of a salt, an ester, an amide, an imide, an acid, or a mixture (e.g., ester/salt) of two or more thereof. The reaction between the acylating agent and the ammonia, amine, hydroxyamine, alcohol, water or mixture thereof to form the surfactant (C)(i) may be carried out under conditions that provide for the formation of the desired product. Typically, the reaction is carried out at a temperature in the range of from about 50° C. to about 250° C.; optionally in the presence of a normally liquid, substantially inert organic liquid solvent/diluent, until the desired product has formed. In one embodiment, the acylating agent and the ammonia, amine, hydroxyamine, alcohol, water or mixture thereof, are reacted in amounts sufficient to provide from about 0.3 to about 3 equivalents of acylating agent per equivalent of ammonia, amine, hydroxyamine, alcohol, water or mixture thereof. In one embodiment, this ratio is from about 0.5:1 to about 2:1.

In one embodiment, the surfactant (C)(i) may be prepared by initially reacting the acylating agents (I) and (II) with the linking compound (III) to form a linked acylating agent, and thereafter reacting the linked acylating agent with the ammonia, amine, hydroxyamine, alcohol, water or mixture thereof, to form the desired product. An alternative method involves reacting the acylating agent (I) and ammonia, amine, hydroxyamine, alcohol, water, or mixture thereof, with each other to form a first intermediate product, separately reacting the acylating agent (II) and ammonia, amine, hydroxyamine, alcohol, water, or mixture thereof (which can be the same or different ammonia, amine, hydroxyamine, alcohol, water, or mixture thereof that is reacted with the acylating agent (I)) with each other to form a second intermediate product, then reacting a mixture of these two products with the linking compound (III).

The number of equivalents of the acylating agents depends on the total number of carboxylic functions present which are capable of reacting as a carboxylic acid acylating agent. For example, there would be two equivalents in an anhydride derived from the reaction of one mole of olefin polymer and one mole of maleic anhydride.

The weight of an equivalent of ammonia or a monoamine is equal to its molecular weight. The weight of an equivalent of a polyamine is the molecular weight of the polyamine divided by the total number of nitrogens present in the molecule. If the amine is to be used as linking compound (III), tertiary amino groups are not counted. On the other hand, if the amine is used in the reaction with the acylating agent to form the surfactant (C)(i), tertiary amino groups are counted. The weight of an equivalent of a commercially available mixture of polyamines can be determined by dividing the product of 100 times the atomic weight of nitrogen (14), that is 1400, by the % N contained in the polyamine.

The weight of an equivalent of an alcohol is its molecular weight divided by the total number of hydroxyl groups present in the molecule. Thus, the weight of an equivalent of ethylene glycol is one-half its molecular weight.

The weight of an equivalent of a hydroxyamine used as a linking compound (III) is equal to its molecular weight divided by the total number of —OH, >NH and —$NH_2$ groups present in the molecule. If the hydroxyamine is to be used in the reaction with the acylating agent to form the surfactant (C)(i), then tertiary amino groups are also counted.

The weight of an equivalent of water is its molecular weight.

In one embodiment, the surfactant (C)(i) comprises the reaction product (e.g., ester/salt) or a polyisobutene (Mn=about 750 to about 3000) substituted succinic acid or anhydride with an alkanol amine (e.g., dimethylethanol amine or diethylethanol amine), the mole ratio of acid or anhydride to amine being about 1:2.

In one embodiment, the surfactant (C)(i) comprises a mixture of: (A) the reaction product (e.g., salt) of a fatty acid (e.g., oleic acid) with an alkanol amine (e.g., diethyethanol amine); and (B) the reaction product (e.g., di-salt) of a polyisobutene (Mn=about 500 to about 3000) substituted succinic acid or anhydride with an alkanol amine (e.g., diethyethanol amine). The weight ratio of (A) to (B) may range from about 3:1 to about 1:3.

In one embodiment, the surfactant (C)(i) comprises a mixture of: the reaction product (e.g., ester/salt) of a polyisobutene (Mn=about 1500 to about 3000) substituted succinic acid or anhydride with an alkanol amine (e.g., dimethylethanol amine); the reaction product (e.g., imide) of a polyisobutene (Mn=about 750 to about 1500) substituted succinic acid or anhydride with an alkylene polyamine (e.g., ethylene polyamine mixture containing diethylene triamine and heavy polyamines); and the reaction product (e.g., ester/salt) of a hydrocarbon (about 12 to about 30 carbon atoms) substituted succinic acid or anhydride with an alkanol amine (e.g., dimethylethanol amine).

Surfactant (C)(ii)

The surfactant (C)(ii) is comprised of (a) a polycarboxylic acylating agent, and (b) a copolymer derived from at least one olefin monomer and at least one alpha, beta unsaturated carboxylic acid or derivative thereof. The acylating agent (a) and copolymer (b) are linked together by (c) a linking group derived from a compound having two or more primary amino groups, two or more secondary amino groups, at least one primary amino group and at least one secondary amino group, at least two hydroxyl groups, or at least one primary or secondary amino group and at least one hydroxyl group.

The polycarboxylic acylating agent (a) is a polycarboxylic acid or reactive equivalent thereof. These polycarboxylic acylating agents may be the same as the polycarboxylic acylating agents described above in the description of the surfactant (C)(i).

The alpha-beta olefinically unsaturated carboxylic acids or derivatives thereof used in making the copolymer (b) may be the same as the alpha, beta olefinically unsaturated carboxylic acid reagents described above in the description of the surfactant (C)(i).

The olefin monomers used in making the copolymer (b) may be the same as olefin monomers described above in the description of the surfactant (C)(i).

In one embodiment, the copolymer (b) is a copolymer of styrene and maleic anhydride, and in one embodiment it is a copolymer of octadecene-1 and maleic anhydride.

The copolymer (b) may be prepared by reacting the olefin monomer with the alpha, beta olefinically unsaturated carboxylic or derivative in the presence of a dialkyl peroxide (e.g., di-t-butyl peroxide) initiator. This is disclosed in British Patent 1,121,464 which is incorporated herein by reference. The molar ratio of olefin monomer to alpha, beta unsaturated carboxylic acid or derivative may range from about 2:1 to about 1:2, and in one embodiment it is about 1:1. The copolymer (b) may have a number average molecular weight in the range of about 2000 to about 50,000, and in one embodiment about 5000 to about 30,000.

The linking group (c) for linking the acylating agent (a) with the copolymer (b) may be any of the linking compounds (III) described above in the description of the surfactant (C)(i) for linking the acylating agent (I) with the acylating agent (II).

The acylating agent (a) and copolymer (b) may be reacted with the linking compound (c) according to conventional ester and/or amide-forming techniques. Alternatively, the linking compound (c) may be reacted with either the acylating agent (a) or copolymer (b) to form an intermediate compound, and then the intermediate compound is reacted with the remaining non-reacted acylating agent (a) or copolymer (b). These reactions involve heating the reactants, optionally in the presence of a normally liquid, substantially inert, organic liquid solvent/diluent. Temperatures of at least about 30° C. up to the decomposition temperature of the reaction component and/or product having the lowest such temperature may be used. The temperature may be in the range of about 50° C. to about 260° C.

The ratio of reactants may be varied over a wide range. Generally, for each equivalent of each of the acylating agent (a) and copolymer (b), at least about one equivalent of the linking compound (c) is used. The upper limit of linking compound (c) is about 2 equivalents of linking compound (c) for each equivalent of acylating agent (a) and copolymer (b). Generally the ratio of equivalents of acylating agent (a) to copolymer (b) is about 0.5:1 to about 2:1, with about 1:1 being useful.

The number of equivalents of the acylating agent (a) and copolymer (b) depends on the total number of carboxylic functions present in each. In determining the number of equivalents for the acylating agent (a) and copolymer (b), those carboxyl functions which are not capable of reacting with the linking compound (c) are excluded. In general, however, there is one equivalent of each acylating agent (a) and copolymer (b) for each carboxyl group in the acylating agent (a) and copolymer (b). The number of equivalents for the linking compound (c) is determined in the same manner as for the linking compounds (III) used to make the surfactant (C)(i).

Surfactant (C)(iii)

The surfactant (C)(iii) is a Mannich reaction product derived from a hydroxy aromatic compound, an aldehyde or a ketone, and an amine containing at least one primary or secondary amino group. The hydroxy aromatic compound may be represented by the formula

(C)(iii)-1 wherein in Formula (C)(iii)-1: Ar is an aromatic group; m is 1, 2 or 3; n is a number from 1 to about 4; with the proviso that the sum of m and n is up to the number of available positions on Ar that can be substituted; each $R^1$ independently is a hydrocarbon group of up to about 400 carbon atoms; and $R^2$ is H, amino or carboxy.

In Formula (C)(iii)-1, Ar may be a benzene or a naphthalene nucleus. Ar may be a coupled aromatic compound. The coupling atom or group may be O, S, $CH_2$, a lower alkylene group having from 1 to about 6 carbon atoms, NH, and the like, with $R^1$ and OH generally being pendant from each aromatic nucleus. Examples of specific coupled aromatic compounds include diphenylamine, diphenylmethylene and the like. m is usually from 1 to about 3, and in one embodiment 1 or 2, and in one embodiment 1. n is usually from 1 to about 4, and in one embodiment 1 or 2, and in one embodiment 1. $R^2$ may be H, amino or carboxyl. $R^1$ may be a hydrocarbon group of up to about 400 carbon atoms, and in one embodiment up to about 250 carbon atoms, and in one embodiment up to about 150 carbon atoms. $R^1$ may be an alkyl group, alkenyl group or cycloalkyl group.

In one embodiment, $R^1$ is a hydrocarbon group derived from an olefin polymer. The olefin polymer may be any of the olefin polymers described above in the description of the surfactant (C)(i). In one embodiment $R^1$ is derived from a polyisobutene. The group $R^1$ may have a number average molecular weight in the range of about 200 to about 5000, and in one embodiment in the range of about 500 to about 2300.

The aldehyde or ketone may be represented by the formula

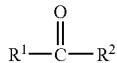
(C)(iii)-2 or a precursor thereof; wherein in Formula (C)(iii)-2: $R^1$ and $R^2$ independently are H or hydrocarbon groups having from 1 to about 18 carbon atoms. $R^1$ and $R^2$ may be hydrocarbon groups containing 1 to about 6 carbon atoms, and in one embodiment 1 or 2 carbon atoms. In one embodiment, $R^1$ and $R^2$ may be independently phenyl or alkyl-substituted phenyl groups having up to about 18 carbon atoms. $R^2$ can also be a carbonyl-containing hydrocarbon group of 1 to about 18 carbon atoms. Examples include formaldehyde, acetaldehyde, benzaldehyde, methyl ethyl ketone, glyoxylic acid, and the like. Precursors of such compounds can be used. These include paraformaldehyde, formalin, trioxane, and the like.

The amine may be any of the amines described in the description of the surfactant (C)(i) above having at least one >N—H or —NH$_2$ group. The amine may be a monoamine, a polyamine or a hydroxyamine.

The ratio of moles of hydroxy aromatic compound to aldehyde or ketone to amine may be about 1:(1 to 2):(0.5 to 2).

Surfactant (C)(iv)

The surfactant component (C)(iv) may be a hydrocarbyl substituted carboxylic acid wherein the hydrocarbyl substituent has at least about 12 carbon atoms, and in one embodiment from about 30 to about 500 carbon atoms, and in one embodiment about 50 to about 500 carbon atoms. The carboxylic acid may be monobasic or polybasic. The polybasic acids include dicarboxylic acids, although tricarboxylic and tetracarboxylic acids may be used. The hydrocarbyl substituent may be derived from polyisobutene, polypropylene, polyethylene, a copolymer derived from isobutene and butadiene, or a copolymer derived from isobutene and isoprene. In one embodiment, the surfactant (C)(iv) comprises a polyisobutene substituted succinic acid. Any of the hydrocarbyl substituted carboxylic acids discussed above under the heading "Surfactant (C)(i)" may be used.

Surfactant (C)(v)

The surfactant (C)(v) may be at least one compound represented by one or more of the formulae:

RO(R'O)$_n$R''' (C)(v)-1

(C)(v)-2

RCOO(R'O)$_n$R''' (C)(v)-3

(C)(v)-4

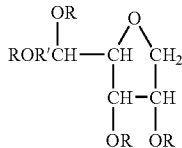
(C)(v)-5

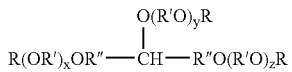
(C)(v)-6 wherein each R is independently hydrogen or a hydrocarbyl group of up to about 60 carbon atoms; each R' and R'' is independently an alkylene group of 1 to about 20 carbon atoms; each R''' is independently hydrogen, or an acyl or hydrocarbyl group of up to about 30 carbon atoms; n is a number in the range of zero to about 50; and x, y and z are independently numbers in the range of zero to about 50 with the total for x, y and z being at least 1. In the above formulae, R may be a hydrocarbyl group of about 6 to about 60 carbon atoms, and in one embodiment abut 6 to about 45 carbon atoms, and in one embodiment about 6 to about 30 carbon atoms, and in one embodiment about 14 to about 30 carbon atoms. In one embodiment, R may be a hydrocarbyl group of about 9 to about 11 carbon atoms. R' and R'' may be independently alkylene groups of about 1 to about 6 carbon atoms, and in one embodiment about 1 to about 4 carbon atoms. In one embodiment, R' is an alkylene group containing about 2 to about 3 carbon atoms, and in one embodiment about 2 carbon atoms. In one embodiment, R'' is an alkylene group containing 1 carbon atom. R''' may be an acyl or hydrocarbyl group of 1 to about 30 carbon atoms, and in one embodiment 1 to about 24 carbon atoms, and in one embodiment 1 to about 18 carbon atoms, and in one embodiment 1 to about 12 carbon atoms, and in one embodiment 1 to about 6 carbon atoms. n may be a number in the range of 1 to about 50, and in one embodiment 1 to about 30, and in one embodiment 1 to about 20, and in one embodiment 1 to about 12, and in one embodiment about 4 to about 10, and in one embodiment about 5 to about 10, and in one embodiment about 5 to about 8, and in one embodiment about 5 or about 6. x, y and z may be independently numbers in the range of zero to about 50, and in one embodiment zero to about 30, and in one embodiment zero to about 10; with the total of x, y and z being at least 1, and in one embodiment in the range of 1 to about 50, and in one embodiment 10 to about 40, and in one embodiment 20 to about 30, and in one embodiment about 25.

Examples of compounds represented by formula (C)(v)-1 that may be used include: C$_9$–C$_{11}$ alkoxy poly (ethoxy)$_8$ alcohol; C$_{12}$–C$_{15}$ alkoxy poly (isopropoxy)$_{22-26}$ alcohol; oleyl alcohol pentaethoxylate; and the like.

Examples of compounds represented by formula (C)(v)-2 that may be used include diglycerol monooleate, diglycerol monostearate, polyglycerol monooleate, and the like.

Examples of compounds represented by formula (C)(v)-3 that may be used include polyethylene glycol (Mn=200) distearate, polyethylene glycol (Mn=400) distearate, polyethylene glycol (Mn=200) dioleate, polyethylene glycol (Mn=400) soya bean oil ester, and the like.

Examples of compounds represented by formula (C)(v)-4 that may be used include glycerol monooleate, diglycerol dioleate, diglycerol distearate, polyglycerol dioleate, and the like.

Examples of compounds represented by formula (C)(v)-5 that may be used include sorbitan monooleate, sorbitan monoisostearate, sorbitan sesquioleate, and sorbitan trioleate, and the like.

Examples of compounds represented by formula (C)(v)-6 that may be used include polyethoxy glycerol trioleate wherein the compound contains 25 ethoxy groups.

In one embodiment, the surfactant (C)(v) is an alkoxy polyethoxy alcohol wherein the alkoxy group contains about 14 to about 30 carbon atoms and the polyethoxy group contains up to about 10 ethoxy groups, and in one embodiment about 5 to about 10 ethoxy groups, and in one embodiment about 5 or 6 ethoxy groups.

In one embodiment, the surfactant (C)(v) is an alkoxy polyethoxy alcohol wherein the alkoxy group contains about 9 to about 11 carbon atoms and the polyethoxy group contains about 8 ethoxy groups.

Surfactant (C)(vi)

The surfactant (C)(vi) may be an ionic or nonionic compound having a hydrophilic lipophilic balance (HLB) in the range of about 1 to about 40, and in one embodiment about 1 to about 20, and in one embodiment about 1 to about 10. These include cationic and amphoteric surfactants. Examples of these compounds are disclosed in *McCutcheon's Surfactants and Detergents*, 1998, North American & International Edition. Pages 1–235 of the North American Edition and pages 1–199 of the International Edition are incorporated herein by reference for their disclosure of such ionic and nonionic compounds. Useful compounds include alkylaryl sulfonate, amine oxide, carboxylated alcohol ethoxylate, ethoxylated amine, ethoxylated amide, glycerol ester, glycol ester, imidazoline derivative, lecithin, lecithin derivative, lignin, lignin derivative, monoglyceride, monoglyceride derivative, olefin sulfonate, phosphate ester, phosphate ester derivative, propoxylated fatty acid, ethoxylated fatty acid, propoxylated alcohol or alkyl phenol, sucrose ester, sulfonate of dodecyl or tridecyl benzene, naphthalene sulfonate, petroleum sulfonate, tridecyl or dodecyl benzene sulfonic acid, sulfosuccinate, sulfosuccinate derivative, or mixture of two or more thereof. These compounds typically contain a hydrocarbon group having at least about 8 carbon atoms, and in one embodiment at least about 12 carbon atoms.

In one embodiment, the surfactant (C)(vi) is a poly(oxyalkene) compound. These include copolymers of ethylene oxide and propylene oxide. In one embodiment, the surfactant (C)(vi) is a copolymer represented by the formula

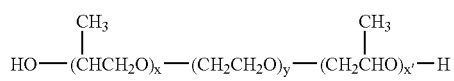

wherein x and x' are the number of repeat units of propylene oxide and y is the number of repeat units of ethylene oxide, as shown in the formula. In one embodiment, x and x' are independently numbers in the range of zero to about 20, provided that x or x' is at least 1, and y is a number in the range of about 4 to about 60. In one embodiment, this copolymer has a number average molecular weight of about 1800 to about 3000, and in one embodiment about 2100 to about 2700.

In one embodiment, the surfactant (C)(vi) is an alkyl alcohol, alkyl amine, alkyl amide or alkyl acid ester. The alkyl group may contain from 1 to about 18 carbon atoms, and in one embodiment about 1 to about 8 carbon atoms. Examples include methanol, ethanol, pentanol, hexanol and ethylhexyl alcohol.

Organic Diluent

The surfactant (C) and any other oil soluble ingredient used in the inventive composition may be diluted with a substantially inert, normally liquid organic diluent such as mineral oil, kerosene, diesel fuel, synthetic oil (e.g., ester of dicarboxylic acid), naphtha, alkylated (e.g., $C_{10}$–$C_{13}$ alkyl) benzene, toluene or xylene to form an additive concentrate. The diluent may be one or more of the solvents (A) discussed above. These concentrates generally contain from about 10% to about 90% by weight of the foregoing diluent.

Rheology Control Agent

The inventive water-in-oil emulsion composition may contain one or more rheology control agents. These include organically modified clays (e.g., bentonite), diatomaceous earth, kaolin, vaterite, gelled overbased sulfonates, gelled overbased carboxylates, and the like. Also included are viscosity modifiers. The viscosity modifiers may be polymeric materials characterized as being hydrocarbon based polymers generally having number average molecular weights from about 1000 to about 500,000, and in one embodiment about 5000 to about 500,000, and in one embodiment about 25,000 to about 500,000, and in one embodiment about 50,000 to about 200,000.

Polyisobutylenes, polyacrylates and polymethacrylates may be used as viscosity modifiers. The polyacrylates and polymethacrylates may be prepared from mixtures of alkyl acrylate or alkyl methacrylate monomers. The alkyl groups may be either straight chain or branched chain groups containing from 1 to about 18 carbon atoms.

When a small amount of a nitrogen-containing monomer is copolymerized with alkyl acrylates or alkyl methacrylates, dispersant or emulsifier properties also are incorporated into the product. Thus, such a product may have the multiple function of viscosity modification and dispersancy. These products may be referred to as dispersant-type viscosity modifiers or simply dispersant-viscosity modifiers. Vinyl pyridine, N-vinyl pyrrolidone and N,N'-dimethylaminoethyl methacrylate are examples of nitrogen containing monomers.

Ethylene-propylene copolymers, sometimes referred to as OCPs, may be used as viscosity modifiers. These polymers may be prepared by copolymerizing ethylene and propylene, generally in a solvent, using known catalysts such as a Ziegler-Natta initiator. The ethylene content of these copolymers may be from about 45 to about 60% by weight, and in one embodiment from about 50% to about 55% by weight. The OCP's that may be used also include terpolymers of ethylene, propylene and a small amount of non-conjugated diene such as 1,4-hexadiene. The OCP's may have an alpha, beta unsaturated carbonyl compound (e.g., maleic anhydride) grafted onto the hydrocarbon backbone of the polymer. The OCP may comprise an ethylene/propylene/non-conjugated diene terpolymer with a functionalized monomer grafted onto the backbone of the terpolymer. The OCP may comprise an ethylene/propylene/norbornadiene terpolymer with maleic anhydride grafted onto its backbone.

Esters obtained by copolymerizing styrene and maleic anhydride in the presence of a free radical initiator and thereafter esterifying the copolymer with one or more alcohols of up to about 18 carbon atoms, and in one embodiment about 4 to about 18 carbon atoms, may be used as the viscosity modifier. The acid groups may be converted to imides by reaction with a primary amine.

Hydrogenated styrene-aliphatic conjugated diene copolymers may be used as the viscosity modifier. The styrenes include styrene, alpha-methyl styrene, ortho-methyl styrene, meta-methyl styrene, para-methyl styrene, para-tertiary butyl styrene, etc. The aliphatic conjugated diene may contain from about 4 to about 6 carbon atoms. Examples of the conjugated dienes include piperylene, 2,3-dimethyl-1,3-butadiene, chloroprene, isoprene and 1,3-butadiene. Mixtures of the conjugated dienes may be used. The styrene content of these copolymers may be in the range of about 20% to about 70% by weight, and in one embodiment about 40% to about 60% by weight. The aliphatic conjugated diene content of these copolymers may be in the range of about 30% to about 80% by weight, and in one embodiment about 40% to about 60% by weight. These copolymers may have number average molecular weights in the range of about 30,000 to about 500,000, and in one embodiment about 50,000 to about 200,000. Hydrogenated styrene-butadiene copolymers useful as viscosity modifiers are available commercially from BASF under the trade designation "Glissoviscal." Hydrogenated styrene-isoprene copolymers useful as viscosity modifiers are available from The Shell Chemical Company under the general trade designation "Shellvis."

The concentration of the rheology control agent in the water-in-oil emulsion composition may be up to about 5% by weight, and in one embodiment about 0.1 to about 2% by weight.

Inorganic Base

The water-in-oil emulsion composition may contain an inorganic base to assist the solvent (A) in softening or dissolving the non-aqueous coating, wax or grease. The inorganic base may be an ammonium or an alkali or alkaline earth metal hydroxide, oxide, aluminate, borate or metasilicate. Specific examples include ammonium hydroxide, sodium hydroxide, potassium hydroxide, lithium hydroxide, calcium hydroxide, sodium aluminate, sodium borate, sodium metasilicate, potassium metasilicate, and the like.

An advantage of using an inorganic base in the inventive emulsion is that, at least in one embodiment, the emulsion delivers the base to the surface of the coating being treated over a period of time rather than all at once. This is believed to provide a measure of control over toxic base materials that would not be available with prior art compositions.

The inorganic base may be present in the water-in-oil emulsion composition at a concentration of up to about 60% by weight based on the weight of the water in the water-in-oil emulsion, and in one embodiment from about 0.1 to about 60% by weight, and in one embodiment from about 0.5 to about 50% by weight, and in one embodiment from about 0.5 to about 20% by weight, and in one embodiment from about 0.5 to about 10% by weight of the water.

Inorganic Salt

The water-in-oil emulsion composition may contain an inorganic salt to assist in stabilizing the emulsion. The inorganic salt may be an ammonium or an alkali or alkaline earth metal halide, sulfate, hydrogen sulfate, phosphate, mono- or dihydrogen phosphate, sulfite, hydrogen sulfite, thiocyanate, oxalate, hypochlorite, carbonate, hydrogen carbonate, chlorite, and the like. Specific examples include sodium chloride, potassium chloride, lithium chloride, calcium chloride, magnesium chloride, potassium sulfate, sodium carbonate, trisodium phosphate, and the like.

The inorganic salt may be present in the water-in-oil emulsion composition at a concentration of up to about 10% by weight of the water in the water-in-oil emulsion, and in one embodiment from about 0.001 to about 10% by weight, and in one embodiment from about 0.01 to about 5% by weight, and in one embodiment from about 0.01 to about 1% by weight, and in one embodiment from about 0.1 to about 1% by weight of the water.

Additional Additives

The water-in-oil emulsion composition may contain an antimisting agent, odor suppressant, corrosion inhibitor, coloring agent, antifreeze agent, biocide, or mixture of two or more thereof. The concentration of each of these may be independently up to about 10% by weight of the total weight of the water-in-oil composition.

Process for Forming the Water-in-Oil Emulsion

The solvent (A), water (B), surfactant (C), and optionally other ingredients as discussed above may be mixed under appropriate mixing conditions to form the desired water-in-oil emulsion composition. The mixing may involve high shear mixing, low shear mixing, or a combination thereof. The mixing may be conducted using a single mixing step or multiple mixing steps. The mixing may be conducted on a batch basis, a continuous basis, or a combination thereof. The shear rate for the mixing may be up to about 500,000 sec$^{-1}$, and in one embodiment about 20,000 to about 200,000 sec$^{-1}$, and in one embodiment about 25,000 to about 120,000 sec$^{-1}$. The mixing may be conducted at a temperature in the range of about 0° C. to about 100° C., and in one embodiment about 10° C. to about 50° C.

Non-Aqueous Coatings That Can Be Removed

The non-aqueous coatings that can be removed may comprise any pigmented or non-pigmented paint or coating that has been applied to a substrate. These include paint, varnish, laquer, and the like. These coatings may comprise one or more binders or resins, and optionally one or more pigments. The term "non-aqueous" is used herein to refer to the fact that the coating that is to be removed is either in the form of a dry film wherein the solvent (i.e., organic or aqueous solvent) has evaporated, or in the form of a coating that is liquid or only partially dried and is non-aqueous.

The binder or resin may be any binder or resin conventionally used in coating or paint formulations. The binder may be a thermoplastic or a thermosetting resin. The binder may be an alkyl-based binder or a latex binder. The binder may be a synthetic resin or a natural resin. Examples include acrylic resins, vinyl resins, polyester resins, alkyd resins, butadiene resins, styrene resins, phthalic acid resins, urethane resins, epoxy resins, and the like. The binder may comprise vinyl or vinylidene polymers or copolymers containing units such as vinyl acetate, vinyl chloride, vinylidene chloride, and the like; hydrocarbon polymers and copolymers containing ethylene or propylene units and oxygenated or halogenated derivatives of ether, butadiene, oxygenated butadiene, isoprene, oxygenated isoprene, butadiene-styrene, butadiene vinyl toluene, isoprene-styrene and the like; polymers or copolymers containing units of acrylic acid, methacrylic acid, their esters, or acrylonitrile; vinylic hydrocarbon monomers reacted with unsaturated materials such as the reaction product of maleic acid or anhydride with styrene; and, broadly, various other resinous rubber-like elastomeric latex polymers and copolymers of ethylenically unsaturated monomers and polymers obtainable in stable aqueous latex form. The binder may comprise a copolymer of vinyl chloride and vinyl acetate. The binders include diphenylmethane diisocyanate, methylene diethyl diisocyanate, isocyanurate, urea-formaldehyde, phenolformaldehyde, phenolic glue, animal hide glues, and the like. Other examples of binders or resins which can be used include fluorine resins, silicone resins, and fibrin resins.

The pigments include opacifying pigments, such as titanium dioxide and zinc oxide, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, woloastonite wood flour, barium sulfate, calcium carbonate, aluminum silicate, and the like can be added as well in conventional amounts traditionally used in coating and paint formulations.

Waxes That can be Removed

The waxes that can be removed include insect and animal waxes, vegetable waxes, mineral waxes, synthetic waxes, and the like. Insect and animal waxes include beeswax and spermaceti. Vegetable waxes include carnauba, candelilla, Japan wax, ouricury wax, rice bran wax, jojoba, castor wax, and bayberry wax. Mineral waxes include montan, peat waxes, ozokerite and ceresin, and petroleum waxes. Synthetic waxes include polyethylene waxes, Fischer-Tropsch waxes, chemically modified waxes, substituted amide waxes, and polymerized α-olefins.

Greases That can be Removed

The greases that can be removed may be comprised of any lubricating oil that has been thickened with a thickening agent. The oils include natural and synthetic oils including petroleum oils. The thickeners include fatty acid soaps of lithium, calcium and aluminum. Finely divided clay particles of the bentonite and hectorite types may be used as grease thickeners after being coated with an organic material such as quaternary ammonium compounds. Several other nonsoap powders that may be used include silica gel, graphite, and polyurea powders.

Process for Removing Non-Aqueous Coatings, Waxes and Greases

The substrate from which the non-aqueous coating, wax or grease may be removed may be any substrate to which the coating, wax or grease has been applied. The substrate may comprise wood, metal, plastic, wall board, composites, and the like.

The conditions underwhich the non-aqueous coating, wax or grease removal process may be practiced may vary. Typically, the process will be conducted under ambient atmospheric conditions. Temperatures from about −20° C. to about 50° C., and in one embodiment about 10° C. to about 40° C., may be used, although higher or lower temperatures may be used. The inventive water-in-oil emulsion composition may be applied using any convenient method such as by dipping, spraying or brushing the emulsion composition onto the non-aqueous coating, wax or grease. The non-aqueous coating, wax or grease softens or dissolves and is thereafter removed using known techniques. In one embodiment, the coating is a paint which blisters or bubbles to permit removal. For resistant coated substrates, it may be desirable to apply the inventive water-in-oil emulsion composition two or more times to fully separate the coating from the substrate. It may be desirable to use a rag, scraper, sand blaster, or the like, to fully remove coating chips from the substrate after the inventive water-in-oil emulsion composition has been given time to soften or dissolve the coating. Alternatively, high pressure water spray may be employed to remove coating chips. The time required for the inventive water-in-oil emulsion composition to act may vary due to a variety of factors such as temperature, coating type, and the particular emulsion composition being used. In general, application times may vary between about one minute and about one hour, although shorter or longer application times may be used.

In one embodiment, the inventive water-in-oil composition may be used to clean paint systems used in mass assembly operations. Paint systems used in mass assembly operations such as the automotive and appliance industries generally rely on a central supply depot from which paint is passed through paint lines to stationary paint stations located within an enclosed paint booth. The parts are painted as they pass through paint booths on a moving conveyor. An example of such a system is disclosed in U.S. Pat. No. 5,019,138, which is incorporated herein by reference. Because the system uses several tanks, valves, pumps, bypass lines and the like, a variety of paints or coatings can be delivered to a given paint station over common lines. The inventive water-in-oil emulsion composition may be used to clean the central supply depot, paint lines, paint stations, spray nozzles, fixtures, walls, robots, floor grating, paint booths, and the like, used in these systems. This may be effected by spraying the control supply depot, paint stations, fixtures, walls, robots, floor grating, paint booths, and the like, with the water-in-oil emulsion composition, and flushing the resulting mixture of emulsion and paint or coating down an appropriate drain. The water-in-oil emulsion composition may be used to clean the paint lines and spray nozzles by flowing the emulsion composition through the paint lines and spray nozzles.

EXAMPLES

The following water-in-oil emulsion compositions are blended in a Waring blender using high shear mixing for 5 minutes. In the following table, all numerical values are in parts by weight.

TABLE I

| | Example | | | | | | |
|---|---|---|---|---|---|---|---|
| | 1 | 2 | 3 | 4 | 5 | 6 | 7 |
| Heavy Aromatic naptha having specific gravity of 0.895, a flash point in excess of 62° C., and viscosity of 1.2 cSt @ 25° C. | 77.5 | 57.5 | — | — | 56.2 | 25.5 | 46.5 |
| Light aromatic naptha having specific gravity of 0.874, a flash point in excess of 104° C. and a viscosity of 0.9 cSt @ 25° C. | — | — | 77.5 | 57.5 | — | — | — |

TABLE I-continued

| | Example | | | | | | |
|---|---|---|---|---|---|---|---|
| | 1 | 2 | 3 | 4 | 5 | 6 | 7 |
| Water | 20 | 40 | 20 | 40 | 40 | 72 | 50 |
| Ester-salt derived from one mole of polyisobutene (Mn = 1000) substituted succinic anhydride and two moles diethyl ethanolamine | 2.5 | 2.5 | 2.5 | 2.5 | 2.5 | 2.5 | 2.5 |
| Ethylene/propylene/norbornadiene terpolymer with maleic anhydride grafted onto backbone | — | — | — | — | 1.3 | — | 1.0 |

The water-in-oil emulsion compositions in the above examples are water-in-oil emulsions characterized by a continuous organic or oil phase, and a discontinuous aqueous phase.

While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composition, comprising:
(A) a solvent selected from the group consisting of: mineral spirits; turpentine; methylene chloride; perchloroethylene; acetone; methyl ethyl ketone; N-methyl pyrrolidone; dimethyl glutarate; dimethyl adipate; and mixtures of two or more;
(B) water; and
(C) a surfactant comprising a mixture of the product made by the reaction of a polyisobutene substituted succinic acid or anhydride with an alkanol amine wherein the polyisobutene group has a number average molecular weight of about 1500 to 3000; the product made from the reaction of a hydrocarbon substituted succinic acid or anhydride with an alkanol amine and wherein the hydrocarbon substituent has about 12 to about 30 carbon atoms, and the product made from the reaction of a polyisobutene-substituted succinic acid or anhydride with at least one alkylene polyamine wherein the polyisobutene group has a number average molecular weight of about 750 to about 1500; and wherein the composition is a water-in-oil emulsion, wherein the solvent is present in the water-in-oil emulsion at about 25 to about 85% by weight; and the composition being characterized by the absence of an oxygen supplying oxidizer salt.

2. The composition of claim 1 wherein the composition further comprises a rheology control agent, an inorganic base, an inorganic salt, an antimisting agent, odor suppressant, corrosion inhibitor, coloring agent, antifreeze agent, biocide, or mixture of two or more thereof.

3. The composition of claim 2 wherein the rheology control agent comprises: a polyisobutene; a polyacrylate; a polymethacrylate; an ethylene-propylene copolymer; a terpolymer derived from ethylene, propylene and a non-conjugated diene; an ester derived from a copolymer of styrene and maleic anhydride, and an alcohol of up to about 18 carbon atoms; a hydrogenated copolymer derived from styrene and a conjugated diene; an ethylene/propylene/non-conjugated diene terpolymer with a functionalized monomer grafted onto the backbone of the terpolymer; an ethylene/propylene/norbornadiene terpolymer with maleic anhydride grafted onto the backbone of the terpolymer; an organically modified clay; diatomaceous earth; kaolin; vaterite; a gelled overbased sulfonate; a gelled overbased carboxylate, or a mixture of two or more thereof.

* * * * *